United States Patent
Moehlenkamp et al.

(10) Patent No.: US 8,526,208 B2
(45) Date of Patent: Sep. 3, 2013

(54) ELECTRICAL CIRCUIT, IN PARTICULAR USED FOR GENERATING ELECTRICAL POWER

(75) Inventors: Georg Moehlenkamp, Großbeeren (DE); Reinhard Wagnitz, Berlin (DE)

(73) Assignee: Converteam Technology Ltd., Rugby (GB)

( * ) Notice: Subject to any disclaimer, the term of this patent is extended or adjusted under 35 U.S.C. 154(b) by 798 days.

(21) Appl. No.: 12/588,286

(22) Filed: Oct. 9, 2009

(65) Prior Publication Data

US 2011/0069519 A1    Mar. 24, 2011

(30) Foreign Application Priority Data

Sep. 23, 2009   (DE) .................... 10 2009 042 690

(51) Int. Cl.
*H02M 5/00*   (2006.01)
(52) U.S. Cl.
USPC .......................................... 363/148; 363/160
(58) Field of Classification Search
USPC ........... 363/1, 2, 8, 9, 10, 148–157, 159–162, 363/164, 165, 170–174, 177; 323/201, 213, 323/215, 217, 361
See application file for complete search history.

(56) References Cited

U.S. PATENT DOCUMENTS

| | | | |
|---|---|---|---|
| 3,999,112 A | 12/1976 | Gyugyi | |
| 5,694,026 A | 12/1997 | Blanchet | |
| 7,102,248 B2 | 9/2006 | Wobben | |
| 7,560,834 B2 | 7/2009 | Joho | |
| 2006/0103137 A1 | 5/2006 | Wobben | |
| 2006/0220471 A1 | 10/2006 | Joho | |
| 2007/0035265 A1 | 2/2007 | Balog, Jr. et al. | |
| 2008/0055953 A1* | 3/2008 | Lacaze | 363/152 |

FOREIGN PATENT DOCUMENTS

| | | |
|---|---|---|
| DE | 100 40 273 | 2/2002 |
| DE | 100 51 222 A1 | 4/2002 |
| DE | 102006012044 | 10/2006 |
| WO | WO 2006/103159 | 10/2006 |

OTHER PUBLICATIONS

Office Action dated Jan. 28, 2011 in corresponding European Patent Application No. 10006857.6.
German Official Report dated Apr. 27, 2010 for corresponding German Application No. 10 2009 042 690.6-32.
English language abstract for EP-1199794-A2 which corresponds to DE-100 51 222-A1.

* cited by examiner

*Primary Examiner* — Harry Behm
*Assistant Examiner* — Matthew Grubb
(74) *Attorney, Agent, or Firm* — Harness, Dickey & Pierce, P.L.C.

(57) ABSTRACT

An electrical circuit, in particular a circuit used for generating electric power, wherein this circuit comprises a generator with n phases, a converter and a transformer to which a p-phase load can be connected. The converter comprises m partial converters, each of the partial converters is composed of p units and each of these units is provided with n/m switching circuits. The switching circuits of the individual units are connected symmetrical to the generator.

17 Claims, 3 Drawing Sheets

US 8,526,208 B2

1

ELECTRICAL CIRCUIT, IN PARTICULAR USED FOR GENERATING ELECTRICAL POWER

The invention relates to an electrical circuit for generating electrical power in accordance with the preamble to claim 1.

An electrical circuit for generating electric power is known from the U.S. Pat. No. 5,694,026, for which a turbine is directly coupled mechanically to a multiphase generator. This generator, in turn, is connected via a converter and a transformer to an electric power grid. No mechanical transmission is provided between the turbine and the generator. In the generator operation, the turbine is supplied with fuel, so that the generator is driven by the turbine and generates electrical power which is then fed via the converter and the transformer into the power supply grid.

A matrix converter is known, for example, from the reference DE 100 51 222 A1 which can be used in particular for generating electric power. When using such a matrix converter, the generator does not necessarily have to be operated with the frequency of the connected power grid, but can also be operated at a higher frequency. One disadvantage of this matrix converter is that the thyristors in this converter are current-carrying only for short intervals which leads to current peaks and thus also to high loads.

It is the object of the present invention to create an electrical circuit which makes it possible to achieve lower loads for the thyristors.

This object is solved with a circuit as disclosed in claim 1.

According to the invention, a generator with n phases, a converter and a transformer are provided to which a p-phase load can be connected. The converter is composed of m number of partial converters, each of the partial converters comprises p number of units, and each unit, in turn, has n/m number of switching circuits. The switching circuits for the individual units are connected symmetrical to the generator.

As a result of the symmetrical connection of the individual units with the generator, current peaks and thus also high loads are avoided for the switching circuits. The current flowing through the individual switching circuits is thus reduced, in particular by a factor which corresponds to the number m of the partial converters. The current-carrying interval of the individual thyristors for the switching circuits is furthermore extended, again by a factor of m.

According to a particularly advantageous embodiment of the invention, the switching circuits of each unit are connected to each p-phase of the generator, wherein the switching circuits of successively following units are preferably connected to generator phases which are offset by one phase. The symmetry achieved in this way makes it possible to effect an especially far-reaching reduction in the load for the switching circuits.

The generator windings of a first and especially advantageous embodiment of the invention are connected in series, relative to each other, and a transformer comprising a primary winding and a secondary winding is provided. The switching circuits of each unit are preferably interconnected on the output side, wherein the units belonging to the individual partial converters are connected to the same secondary winding, thereby achieving in a simple manner a galvanic separation of the partial converters relative to each other.

With a second and especially advantageous embodiment of the invention, the generator windings form m series connections which are switched parallel to each other, and the transformer comprises a primary winding and a single secondary winding. The switching circuits of each unit are advantageously interconnected on the output side, wherein all units of

2 the partial converters are connected to the secondary winding. A simple galvanic separation of the partial converters is achieved in this way as well.

Additional features, options for use and advantages of the invention follow from the exemplary embodiments of the invention which are described below and are shown in the Figures of the drawing. All described or illustrated features by themselves or in any combination form the subject matter of the invention, independent of how they are combined in the patent claims or the references back, as well as independent of their formulation or representation in the description or in the drawing.

FIG. 1 schematically shows a block diagram of an exemplary embodiment of a system according to the invention for generating power.

Figure 1:
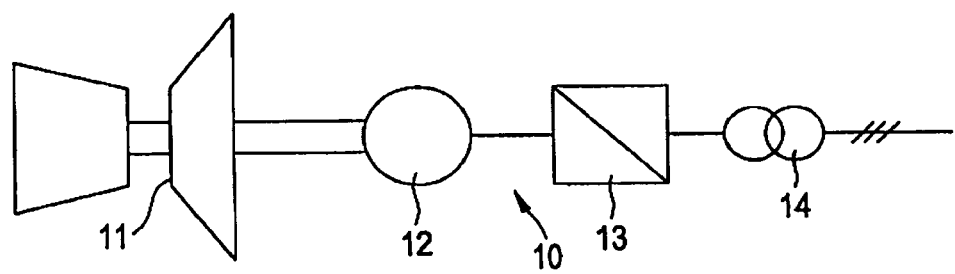

The system 10 shown in FIG. 1 for generating power comprises a turbine 11 which is mechanically directly connected to an electric generator 12. A series-connected transmission or the like does not exist. The generator 12 is connected to an electrical converter 13 to which an electrical transformer 14 is connected. The transformer 14 is furthermore connected to a non-depicted electrical load, for example to an electric power grid. The present exemplary embodiment therefore relates to a three-phase load or a three-phase electric power grid.

During the operation, the turbine 11 is put into rotation, for example, with the aid of fuels. By way of the direct mechanical connection, the generator 12 is also put into rotation and thus generates in a generator operation an output voltage with a rotational speed-dependent frequency. With the aid of the converter 13, this changeable frequency of the output voltage is converted to an essentially fixed frequency which corresponds, for example, to the frequency of the electric power grid. Following this, the output voltage is increased with the aid of the transformer 14 to a predetermined voltage, for example the voltage of the electric power grid. In this way, electric power is on the whole generated by the aforementioned system 10 and is then fed, for example, into the electric power grid.

Figure 2:
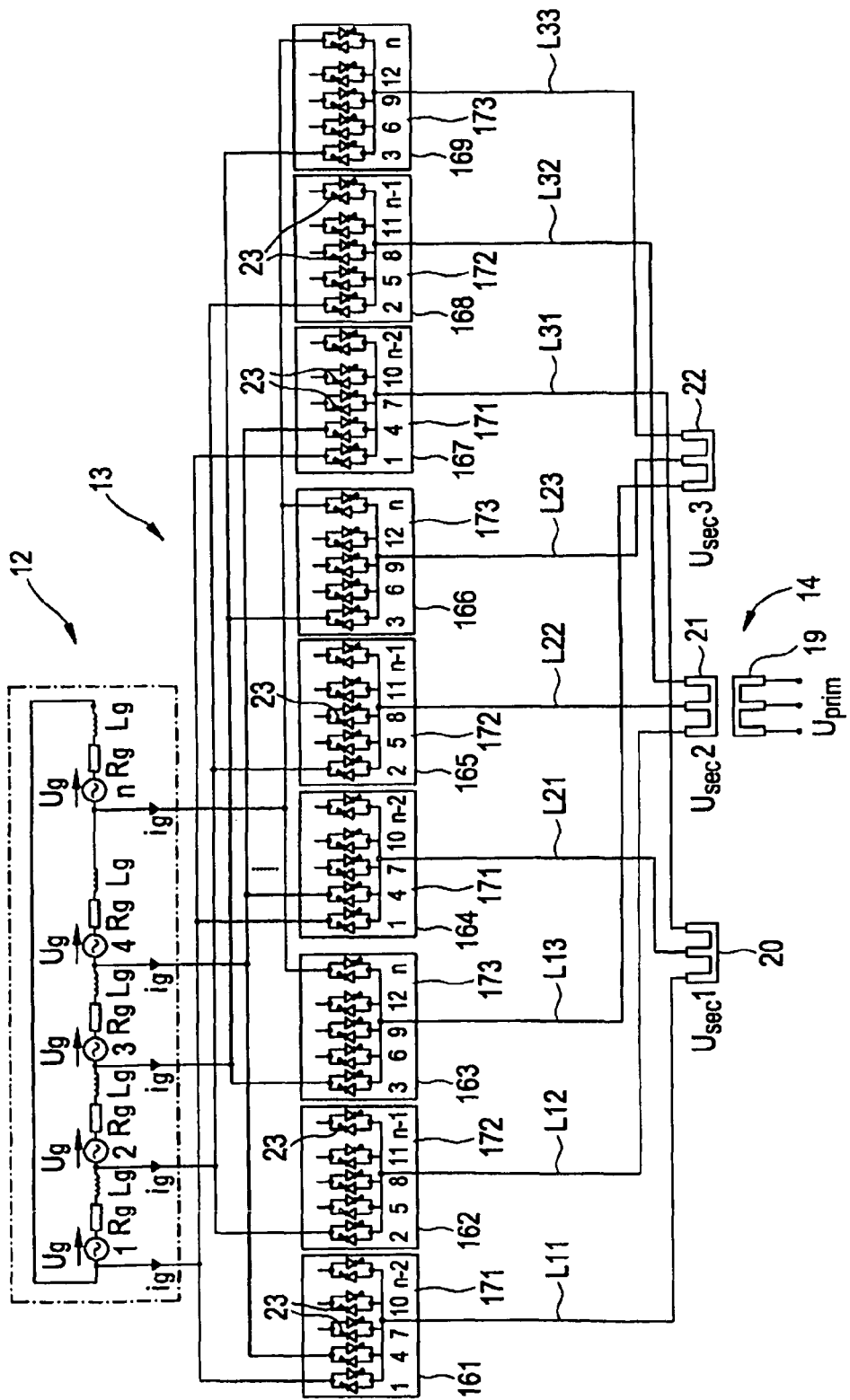
FIG. 2 shows a circuit diagram of a first exemplary embodiment of an electrical circuit according to the invention for a generator, a converter and a transformer for use in the system according to FIG. 1.

FIG. 2 shows in further detail the generator 12, the converter 13 and the transformer 14 of a first exemplary embodiment, as well as the electrical interconnection.

The generator 12 is a synchronous generator, comprising a total number of n windings. In the following, the generator 12 is also referred to as n-phase generator and, in particular, can be a 27-phase synchronous generator with a polygonal shape for the windings.

An equivalent circuit diagram for the generator 12 is shown in FIG. 2. It follows from FIG. 2 that each of the n windings has a line resistance Rg and a winding inductance Lg. In the generator operation for the generator 12, a voltage Ug is induced in each of the n windings, thereby resulting in a current ig to the converter 13.

A differentiation can be made between the line resistances Rg, the winding inductances Lg, the voltages Ug and the currents ig with the aid of the numbers "1" to "n" which is indicated in FIG. 2 in that the variables belonging together are respectively assigned the corresponding digit.

In the equivalent circuit diagram shown in FIG. 2, the induced voltages Ug, the line resistance Rg and the line inductance Lg of each of the n windings form a series connection and these series connections of the n windings are furthermore also connected in series. The currents ig branch off from the individual windings and are insofar parallel connected.

The converter 13 is a matrix converter composed of a number of units given the reference b. As will be explained later on, these b units form m partial converters, resulting in the connection b=m×p, wherein the references b, m and p must have whole number values. The number m of partial converters must furthermore form a whole-number divisor for the total number of n windings of the generator 12.

The present exemplary embodiment consists of three partial converters. For the previously explained 27-phase generator 12 and the three-phase load, we therefore obtain nine units. In FIG. 2, these nine units are numbered consecutively with the reference numbers 161, 162, 163, . . . , 169.

The first partial converter is composed of the units 161, 164, 167 and is given the reference number 171 in FIG. 2. The second partial converter is composed of the units 162, 165, 168 and is given the reference number 172. The third partial converter is composed of the units 163, 166, 169 and is given the reference number 173.

The number of units for each partial converter corresponds to the number of phases of the load and/or the electric power grid to which the converter 13 is connected via the transformer 14. As previously mentioned, the present exemplary embodiment relates to a three-phase load. Each of the partial converters 171, 172, 173 of this exemplary embodiment is therefore composed of three units, which results in a total number of 9 units.

In theory, p phases could generally also be present which would then have to be taken into consideration for the number b of units, as well as the number m of partial converters and the number n of generator 12 windings.

Each of the units 161, . . . , 169 is provided with n/m switching circuits 23. For the aforementioned example of the 27-phase generator 12, each of the units 161, . . . , 169 is thus provided with nine switching circuits 23. Finally, each of the switching circuits 23 is configured with two thyristors that are switched parallel in opposite directions, wherein a series connection of two thyristors that are switched parallel in opposite directions can also be planned, especially in view of a higher blocking voltage.

The switching circuits 23 for the individual units 161, . . . , 169 of the partial converters 171, 172, 173 are connected symmetrical to the generator 12. If we assume for the present exemplary embodiment a 27-phase generator 12 and a three-phase load and/or a three-phase electric power grid, the switching circuits 23 of the individual units 161, . . . , 169 are consequently not connected to successive phases of the generator 12, but within each unit there is always only one connection to each third phase.

In the general case with p phases for the load or the electric power grid, a connection thus exists from the switching circuit 23 of a unit to each p-th phase of the generator 12.

The connections between the switching circuits 23 and the individual units furthermore differ in that the switching circuits 23 of successively following units 161, . . . , 169 are always connected to a phase of the generator 12 that is offset by one phase.

In FIG. 2, the switching circuits 23 of the units 161 of the partial converter 171 are thus connected to the phases 1, 4, 7, 10, . . . , n−2 of the generator 12. Correspondingly, the switching circuits 23 of the unit 162 of the partial converter 172 are connected to the phases 2, 5, 8, 11, . . . , n−1 of the generator 12 and the switching circuits 23 of the unit 163 of the partial converter 173 are connected to the phases 3, 6, 9, 12, . . . , n of the generator 12. In a corresponding manner, the units 164, 165, 166, 167, 168, 169 are connected to the respective phases of the generator 12.

The switching circuits 23 of an individual unit 161, . . . , 169 are connected parallel to each other. On the input side, the switching circuits 23 are connected to the phases of the generator 12, as explained.

On the output side, the switching circuits 23 of an individual unit are interconnected. With a total number of nine units for the three partial converters, we thus obtain nine output lines which are given the references L11, L12, L13, L21, L22, L23, L31, L32 and L33 in FIG. 2. For the present exemplary embodiment shown in FIG. 2, the second digit characterizes the association with a specific partial converter and the first digit characterizes the association with a specific unit within the respective partial converter.

The transformer 14 comprises a primary winding 19 and several secondary windings. In general, the number of secondary windings corresponds to the number m of the partial converters. For the present exemplary embodiment with three partial converters, the transformer 14 therefore has three secondary windings 20, 21, 22. The primary windings 19 and the secondary windings 20, 21, 22 of the present exemplary embodiment have respectively three tapping points. The number of tapping points generally corresponds to the number p of the load phases and/or the electric power grid. The primary winding 19 and the secondary windings 20, 21, 22 are magnetically coupled.

The three units of each partial converter 171, 172, 173 are connected to the three tapping points of the same secondary winding. The connection between the units of the partial converters and the secondary windings is insofar symmetrical.

For the present exemplary embodiment shown in FIG. 2, the output lines L11, L21, L31 belonging to the first partial converter 171 are connected to the tapping points of the secondary winding 20, the output lines L12, L22, L32 belonging to the second partial converter 172 are connected to the tapping points of the secondary winding 21 and the output lines L13, L23, L33 belonging to the third partial converter 173 are connected to the tapping points of the secondary winding 22.

The secondary windings 20, 21, 22 carry the voltages $U_{sec1}$, $U_{sec2}$, $U_{sec3}$. A voltage $U_{prim}$ is present at the primary winding 19, wherein this voltage is supplied to the load or fed to the three-phase electric power grid assumed for this example. In general, a p-phase load or a p-phase electric power grid can be connected to the primary winding 19.

The amplitude of the voltage $U_m$, can be adjusted through the ratio of the primary winding 19 to the secondary windings 20, 21, 22 and the frequency of the voltage $U_{prim}$ can be adjusted by correspondingly triggering the individual thyristors of the switching circuits 23.

A galvanic separation of the three partial converters 171, 172, 173 is achieved with the aid of the three secondary windings 20, 21, 22.

Figure 3:
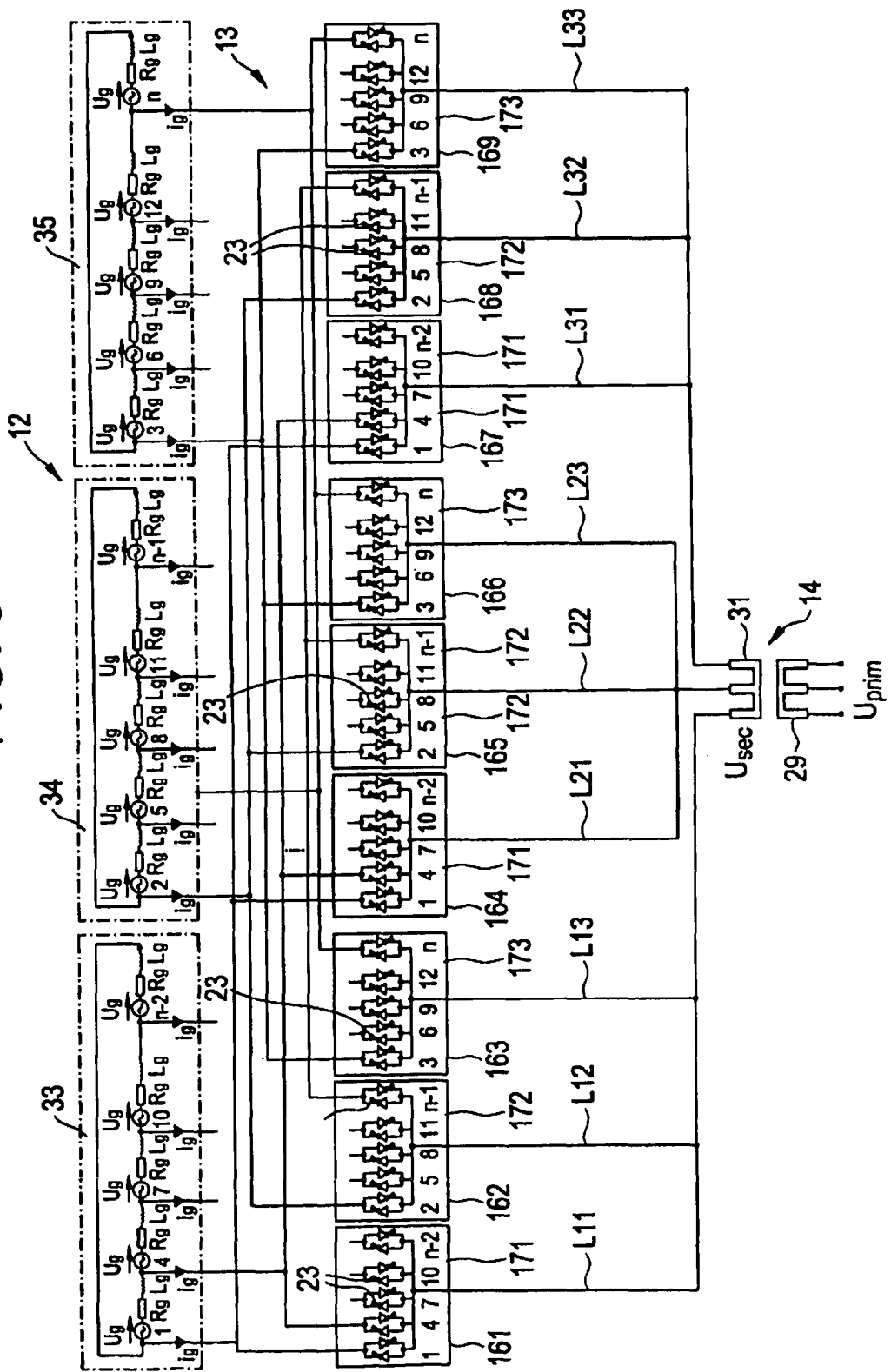
FIG. 3 shows a circuit diagram for a second exemplary embodiment of an electrical circuit for a generator, a converter and a transformer for use in the system according to FIG. 1.

In FIG. 3, the generator 12, the converter 13 and the transformer 14 as well as their electrical interconnections are shown in further detail in the second exemplary embodiment. The configuration of the converter 13 in FIG. 3, in particular the configuration with nine units 161, . . . , 169 in the three partial converters 171, 172, 173 and their electrical connection to the switching circuits 23 corresponds to the one shown in FIG. 2. The same components are therefore given the same references. In view of these coinciding components, we point to the explanations provided in FIG. 2.

The electrical interconnection between the converter 13 and the generator 12 as well as between the converter 13 and the transformer 14 in FIG. 3 differs considerably from the one shown in FIG. 2. The generator 12 and the transformer 14 in FIG. 3 furthermore also differ from those shown in FIG. 2, wherein these differences are explained in the following.

The generator 12 in FIG. 3 differs from the one in FIG. 2 in that not all n phases are connected in series to each other, as shown for FIG. 2, but that in FIG. 3 always only n/m phases form a series connection and that the resulting m series connections are switched parallel to each other. The number of series connections thus corresponds to the number of partial converters. For the present exemplary embodiment with a 27-phase generator 12 and three partial converters, respectively nine phases of the generator 12 are connected in series and three such series connections are then switched parallel to each other. In FIG. 3, the aforementioned three series connections are given the reference numbers 33, 34, 36.

Each of the series connections 33, 34, 35 of the generator 12 contains windings which do not follow each other directly, but in all cases only for each p winding. For the present exemplary embodiment of a three-phase load and/or a three-phase electric power grid, the individual series connections 33, 34, 35 therefore always contain each third winding. According to FIG. 3, the series connection 33 contains the windings 1, 4, 7, . . . , n−2, the series connection 34 contains the windings 2, 5, 8, . . . , n−1, and the series connection 35 contains the windings 3, 6, 9, . . . , n.

The switching circuits 23 of the individual units 161, . . . , 169 for the partial converters 171, 172, 173 are connected symmetrical to the series connections 33, 34, 35 of the generator 12. If, as assumed for the present example, a 27-phase generator 12 and a three-phase load exist, it means that the switching circuits 23 of the individual units 161, . . . , 169 are not connected to successive phases of the series connections 33, 34, 35, but that in all cases only one connection to each third winding exists within a unit.

For the general case with p phases for the load and/or the electric power grid, a connection therefore exists from the switching circuits 23 of a unit to each p phase of the series connections of the generator 12.

The connections between the switching circuits 23 and the individual units furthermore differ in that the switching circuits 23 of the successively following units 161, . . . , 169 are always connected to a phase of the generator 12 that is offset by one phase.

In FIG. 3, the switching circuits 23 of the unit 161 of the partial converter 171 are therefore connected to the phases 1, 4, 7, 10, . . . , n−2 of the series connection 33 of the generator 12.

The switching circuits 23 of the unit 162 of the partial converter 172 are correspondingly connected to the phases 2, 5, 8, 11, . . . , n−1 of the series connection 34 of the generator 12, and the switching circuits 23 of the unit 163 of the partial converter 173 are connected to the phases 3, 6, 9, 12, . . . , n of the series connection 35 of the generator 12. In a corresponding manner, the units 164, 165, 166, 167, 168, 169 are also connected to the phases of the respective series connections 33, 34, 35 of the generator 12.

A galvanic separation of the three partial converters 171, 172, 173 is achieved with the aid of the three series connections 33, 34, 35 of the generator 12.

The transformer 14 comprises a primary winding 29 and a single secondary winding 31. For the present exemplary embodiment, the primary winding 29 and the secondary winding 31 are respectively provided with three tapping points, wherein the number of tapping points in general corresponds to the number of phases for the connected load. A voltage $U_{sec}$ is present at the secondary winding 31, while a voltage $U_{prim}$ can be tapped at the primary winding 29. The primary winding 29 and the secondary winding 31 are magnetically coupled.

Respectively three successively following units of the nine units 161, . . . , 169 are interconnected and are then connected to one of the three tapping points on the secondary winding 31. It means that corresponding units of different partial converters are always connected to the same tapping point on the secondary winding 31. The connection between the units of the partial converters and the secondary winding is insofar symmetrical.

For the present exemplary embodiment shown in FIG. 3, the output lines L11, L12, L13 belonging to the three partial converters 171, 172, 173 are connected to the first tapping point of the secondary winding 31, the output lines L21, L22, L23 belonging to the three partial converters 171, 172, 173 are connected to the second tapping point of the secondary winding 31 and the output lines L31, L32, L33 belonging to the three partial converters 171, 172, 173 are connected to the third tapping point of the secondary winding 31.

As previously mentioned, the voltage $U_{prim}$ is present at the primary winding 29 and is supplied to the load or the three-phase electric power grid for this example. In general, the primary winding 29 can be connected to a p-phase load.

The amplitude of the voltage $U_{prim}$ can be adjusted with the aid of the ratio of primary winding 29 to secondary winding 31, and the frequency of the voltage $U_{prim}$ can be adjusted through a corresponding triggering of the individual thyristors of the switching circuits 23.

The invention claimed is:

1. An electrical circuit, said circuit comprising:
   an n-phase generator;
   a transformer, to which a p-phase load is connectable; and
   a converter, including m partial converters, each of the m partial converters being subdivided into p units, each of the p units including n/m switching circuits, the switching circuits of individual ones of the p units being connected symmetrically to the n-phase generator, wherein
   the windings of the generator form m series connections, which are connected parallel to each other, and
   the transformer includes a primary winding and a single secondary winding.

2. The electrical circuit according to claim 1, wherein the switching circuits of each of the p units are connected to each p-th phase of the generator.

3. The electrical circuit according to claim 2, wherein the switching circuits of successively ones of the p units are connected to a phase of the generator that is offset by one phase.

4. The electrical circuit according claim 2, wherein windings of the n-phase generator are connected in series, relative to each other, and wherein the transformer comprises a primary winding and m secondary windings.

5. The electrical circuit according to claim 4, wherein the switching circuits of each of the p units are interconnected on an output side, and wherein the p units belonging to the individual partial converters are connected to the same secondary winding.

6. The electrical circuit according to claim 2, wherein the windings of the generator form m series connections, which are connected parallel to each other, and wherein the transformer comprises a primary winding and a single secondary winding.

7. The electrical circuit according to claim 6, wherein the switching circuits of each of the p units are interconnected on an output side and wherein all units of the partial converters are connected to the secondary winding.

8. The electrical circuit according to claim 2, wherein the generator is connected mechanically to a turbine.

9. The electrical circuit according to claim 1, wherein the switching circuits of successively ones of the p units are connected to a phase of the generator that is offset by one phase.

10. The electrical circuit according to claim 1, wherein each of the switching circuits is provided with two thyristors, switched parallel in opposite directions.

11. The electrical circuit according to claim 10, wherein each of the switching circuits comprises two series connections of thyristors that are switched parallel in opposite directions.

12. The electrical circuit according to claim 1, wherein the number m of the partial converters represents a whole number divisor for the number n of the generator phases of the n-phase generator.

13. The electrical circuit according to claim 1, wherein the switching circuits of each of the p units are interconnected on an output side and wherein all units of the partial converters are connected to the secondary winding.

14. The electrical circuit according to claim 1, wherein a p-phase power supply grid is connected to the primary winding.

15. The electrical circuit according to claim 1, wherein the generator is connected mechanically to a turbine.

16. The electrical circuit according to claim 1, wherein the electrical circuit is useable for generating electrical power.

17. The electrical circuit according to claim 1, wherein a p-phase power supply grid is connected to the primary winding.

* * * * *